United States Patent
Um et al.

(10) Patent No.: US 9,563,764 B2
(45) Date of Patent: Feb. 7, 2017

(54) METHOD AND APPARATUS FOR PERFORMING AUTHENTICATION BETWEEN APPLICATIONS

(71) Applicant: Samsung Electronics Co., Ltd., Suwon-si, Gyeonggi-do (KR)

(72) Inventors: Tae-kwang Um, Suwon-si (KR); Sun-eung Park, Suwon-si (KR); Jin-goo Seo, Seoul (KR); Do-jun Yang, Yongin-si (KR); Cheol-ju Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 14/184,065

(22) Filed: Feb. 19, 2014

(65) Prior Publication Data

US 2014/0281495 A1    Sep. 18, 2014

(30) Foreign Application Priority Data

Mar. 18, 2013    (KR) ........................ 10-2013-0028822

(51) Int. Cl.
*G06F 21/44*    (2013.01)
(52) U.S. Cl.
CPC .................... *G06F 21/44* (2013.01)
(58) Field of Classification Search
None
See application file for complete search history.

(56) References Cited

U.S. PATENT DOCUMENTS

| 8,225,093 | B2 | 7/2012 | Fok et al. |
| 9,311,317 | B1* | 4/2016 | Savant ............. G06F 17/30091 |
| 2006/0225128 | A1 | 10/2006 | Aittola et al. |
| 2010/0313189 | A1* | 12/2010 | Beretta ............... G06F 9/45516 717/148 |
| 2012/0291114 | A1 | 11/2012 | Poliashenko et al. |
| 2013/0174241 | A1* | 7/2013 | Cha ..................... H04L 63/0815 726/7 |
| 2014/0020094 | A1* | 1/2014 | Wang et al. .................... 726/22 |
| 2014/0173761 | A1* | 6/2014 | Hong et al. ..................... 726/30 |
| 2014/0205099 | A1* | 7/2014 | Christodorescu et al. ... 380/278 |
| 2014/0298420 | A1* | 10/2014 | Barton .................... H04L 63/10 726/4 |
| 2015/0143455 | A1* | 5/2015 | Bettini et al. .................... 726/1 |

FOREIGN PATENT DOCUMENTS

EP    1 947 611 A2    7/2008

* cited by examiner

*Primary Examiner* — Michael R Vaughan
(74) *Attorney, Agent, or Firm* — Jefferson IP Law, LLP (57) ABSTRACT

A method performed by a first application in a client apparatus to authenticate a second application in the client apparatus is provided. The method includes, when the first application receives an execution request from the second application, requesting authentication information of the second application from an authentication server, obtaining the authentication information of the second application from the authentication server, and authenticating the second application using the authentication information, wherein the authentication information of the second application is signed with a private key of the authentication server.

13 Claims, 5 Drawing Sheets

METHOD AND APPARATUS FOR PERFORMING AUTHENTICATION BETWEEN APPLICATIONS

CROSS-REFERENCE TO RELATED APPLICATION(S)

This application claims the benefit under 35 U.S.C. §119(a) of a Korean patent application filed on Mar. 18, 2013 in the Korean Intellectual Property Office and assigned Serial No. 10-2013-0028822, the entire disclosure of which is hereby incorporated by reference.

TECHNICAL FIELD

The present disclosure relates to a method and an apparatus for accurately performing authentication between applications. More particularly, the present disclosure relates to a method and an apparatus for performing authentication between applications by receiving authentication information of an application to be authenticated from an authentication server.

BACKGROUND

An Android application, which may purposely call another application, has advantages that an action of the Android application may be easily extended and an application service may be rapidly developed. However, when an application calls another application, in order to maintain security, a calling application (hereinafter, referred to as a master application) needs to authenticate a called application (hereinafter, referred to as a slave application) and the slave application needs to authenticate the master application.

Examples of a method of authenticating an application of the related art include a method of exchanging a certificate of authentication through a Certificate Authority (CA) and a method of exchanging a public key. However, the method of exchanging a certificate of authentication has a drawback in that since the CA intervenes, costs are high. The method of exchanging a public key has a problem that both slave and master applications have to have a private key and a public key as a pair and, since each application has to protect the private key by itself, it is difficult to manage the private key and maintain security.

Therefore, a need exists for a method and an apparatus for accurately performing authentication between applications at low costs.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure provides a method and an apparatus for accurately performing authentication between applications at low costs.

In accordance with an aspect of the present disclosure, a method performed by a first application in a client apparatus to authenticate a second application in the client apparatus is provided. The method includes, when the first application receives an execution request from the second application, requesting authentication information of the second application from an authentication server, obtaining the authentication information of the second application from the authentication server, and authenticating, by the first application, the second application using the authentication information, wherein the authentication information of the second application is signed with a private key of the authentication server.

The authenticating of the second application may include authenticating the authentication information of the second application using a public key of the authentication server, and comparing a Hash-based Message Authentication Code (HMAC) value obtained from an application package (apk) file of the second application with an HMAC value included in the authenticated authentication information.

The authenticating of the second application may include, according to a result of the comparison, extracting an execution file of the second application from each of the apk file of the second application and a cache memory, and comparing the execution file extracted from the apk file of the second application with the execution file extracted from the cache memory.

According to a result of the authentication of the second application, the method may further include ending an execution of the first application, and transmitting identification information of the first application to the second application, wherein the second application obtains authentication information of the first application from the authentication server by using the identification information of the first application, and wherein the obtained authentication information is used when the second application authenticates the first application.

After the second application authenticates the first application, the method may further include, when the first application receives the execution request from the second application, authenticating the second application using the authentication information of the second application, and according to a result of the authentication of the second application, enabling the first application to perform an action requested by the second application.

When the action of the first application is completed, the method may further include ending an execution of the first application, and transmitting the identification information of the first application and an action result value to the second application, wherein the second application authenticates the first application using the authentication information of the first application, and according to a result of the authentication of the first application, performs another action by using the action result value.

The requesting of the authentication server may include, before the first application transmits an execution request to the second application, requesting the authentication information of the second application from the authentication server.

In accordance with another aspect of the present disclosure, a client apparatus in which a first application authenticates a second application is provided. The apparatus includes an application management unit configured to transmit identification information of the second application to the first application, obtain identification information of applications installed in the client apparatus, and transmit the identification information of the second application to the first application, and a storage unit configured to store a public key and signed authentication information, wherein the first application, when receiving an execution request from the second application, requests authentication information of the second application from an authentication server, obtains the authentication information of the second application from the authentication server, and authenticates the second application using the authentication information, wherein the second application transmits the execution request to the first application, and wherein the authentication information of the second application is signed with a private key of the authentication server.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present disclosure will be described with reference to the accompanying drawings, in which various embodiments of the disclosure are shown.

Figure 1:
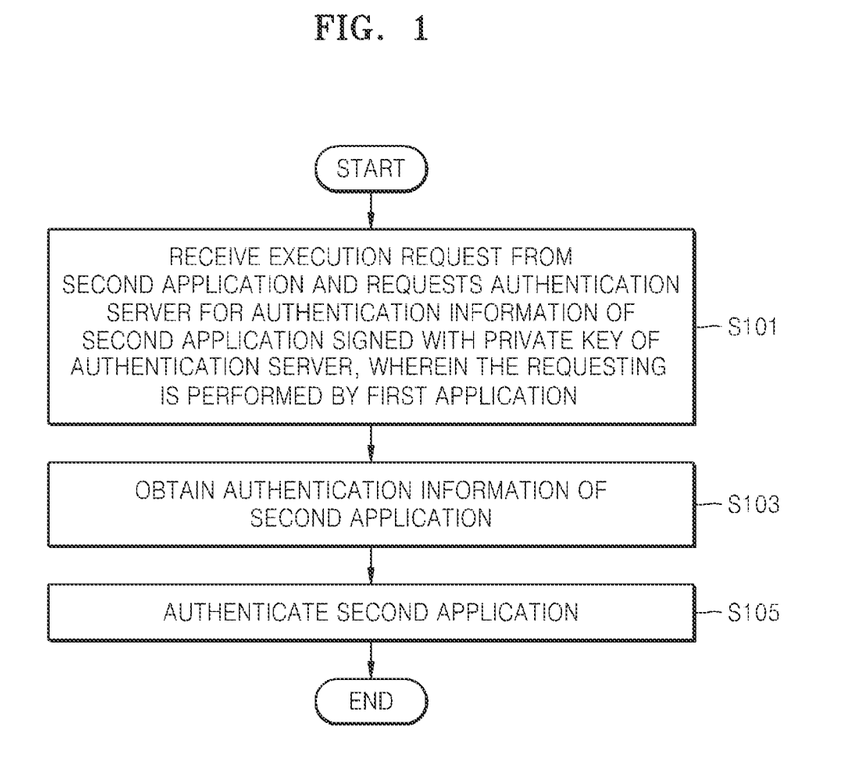
FIG. 1 is a flowchart illustrating a method performed by a first application to authenticate a second application according to an embodiment of the present disclosure.

FIG. 1 is a flowchart illustrating a method performed by a first application to authenticate a second application according to an embodiment of the present disclosure.

In FIG. 1, the first application may be a slave application and the second application may be a master application. However, the present embodiment is not limited thereto, and the first application may be a master application and the second application may be a slave application. In FIG. 1, the master application may be an application that calls the slave application and uses an action result value of the slave application, and the slave application may be an application that is called by the master application, performs an action requested to be executed by the master application, and transmits an action result value to the master application.

Referring to FIG. 1, in operation S101, when receiving an execution request from the second application, the first application may request authentication information of the second application from an authentication server. The authentication server may be a Hash-based Message Authentication Code (HMAC) server that stores and manages HMAC values of applications. In this case, before executing according to the execution request of the second application, the first application may request the authentication information of the second application from the authentication server by transmitting identification information, including a software version and a package name of the second application, to the authentication server.

The identification information, including the software version and the package name of the second application, transmitted to the authentication server when the authentication information is requested may be received by the first application along with the execution request when the first application receives the execution request from the second application.

In operation S103, the first application may receive and obtain the authentication information of the second application from the authentication server in response to the request in operation S101. A digital signature, which is a value obtained by encrypting a hash value of the authentication information with a private key of the authentication server, may also be received along with the authentication information. Accordingly, the first application having received the authentication information from the authentication server may determine whether an HMAC value of the authentication information is forged or altered by comparing the hash value of the authentication information, which is obtained by decrypting the digital signature with a public key of the authentication server, with a hash value of the authentication information received from the authentication server.

The authentication information may include an HMAC value, which may be generated from an application package (apk) file of each application. A digital signature of each application, which is encrypted with the private key of the authentication server, may be generated by signing the HMAC value, which may be generated from the apk file of each application, with the private key of the authentication server. In this case, the digital signature may be a value obtained by encrypting a hash value of the HMAC value with the private key of the authentication server.

Once the apk file of the application is changed, an HMAC value of the application may also be changed. Accordingly, the first application may authenticate the second application by comparing an HMAC value generated by using an apk file stored in a client apparatus with an HMAC value received from the authentication server.

An HMAC value stored in the authentication server may be an HMAC value of an application registered in a market that installs the application. In addition, an HMAC value may be stored in the authentication server for an application which passes an examination according to a market registration request of the application. In this case, a list of applications which pass the examination may be registered in the authentication server as a white list. In general, an HMAC value is a value used to detect whether a message is forged or altered while being transmitted. Accordingly, when an apk file requested to be registered is transmitted to an application market from a developer of an application, an HMAC value of the apk file may also be transmitted in order to detect that the apk file is forged or altered. The HMAC value may be generated according to an HMAC generation algorithm from a message, and a key value shared between a receiver of the message and a creator of the message. Accordingly, when the apk file corresponding to the message is changed, the HMAC value is also changed.

By using characteristics of the HMAC value, whether an application in the client apparatus is forged or altered may be detected by comparing an HMAC value of an application included in a white list of the authentication server stored in the authentication server with an HMAC value of an application in the client apparatus. Accordingly, the authentication server may store an HMAC value of an apk file as authentication information which may be identified according to information about a software version and a package name of an application and may use the HMAC value to authenticate the application.

In addition, in FIG. 1, even when there is a data generation method that varies according to a file of an application, for example, an apk file, like an HMAC value, an application may be authenticated in the same manner as that in a method of detecting forgery or alteration by using the HMAC value. For example, an application that is to authenticate another application may detect whether the application to be authenticated is forged or altered by comparing a data value generated in the data generation method and stored in a server with a data value generated in the data generation method from an apk file in the client apparatus.

The first application may authenticate the received authentication information by using the public key of the authentication server and the digital signature encrypted with the private key of the authentication server. More specifically, the first application may authenticate the authentication information received from the authentication server by comparing a hash value of the authentication information, which is obtained by decrypting the digital signature by using the public key of the authentication server, with a hash value of the authentication information received from the authentication server. The first application may authenticate that the authentication information is not forged or altered and an entity transmitting the authentication information is the authentication server by authenticating the authentication information with the digital signature and the public key. In this case, the public key of the authentication server may be received from the authentication server and used by the first application to authenticate the authentication information.

When authentication information is signed with the private key, the authentication information may be signed in a digital signature method. A digital signature, which is digital information attached or logically coupled to data to be transmitted, may be used to identify a signer and demonstrate that the signer acknowledges content of the data. The digital signature, which may be generated with a digital signature generation key by using an asymmetric encryption method, may be defined as a set of continued arbitrary numbers, letters, symbols, or the like. A subscriber who wants the digital signature owns a digital signature generation key and a digital signature verification key as his/her digital signature keys. The digital signature generation key is a private key which the subscriber may use, and the digital signature verification key is a public key which is used when others verify data that carries the digital signature. For example, others may identify the signer by using the public key and access and read the data, and the private key may be used to put the digital signature on the data when the subscriber transmits the data to others. Since the digital signature does not encrypt the data itself, a third party may access and read content of the data without difficulty. However, the digital signature is used to verify that a person who is stated as a creator of the data has created the data and the data is not forged or altered while being transmitted/received, thereby making it impossible for the creator to deny that he/she has created the data.

When the authentication information of the second application may not be received from the authentication server, that is, when the second application is not included in the white list and thus, the authentication information does not exist, the second application corresponds to an unregistered application and thus, may not be authenticated.

In operation S105, the first application may authenticate the second application using the authentication information received from the authentication server. The first application may authenticate the second application in the client apparatus by using the authentication information authenticated with the public key of the authentication server. After authenticating the second application, the first application may execute an action according to the execution request of the second application.

Even when the first application is a master application and the second application is a slave application, authentication may be performed in the same manner as that described with reference to FIG. 1. When the first application is to perform another action by using an action result value of the second application, the first application may authenticate whether the second application is safe. In this case, after authenticating the second application using the authentication information in order to verify the second application, the first application may transmit an execution request of the first application to the second application. For example, after obtaining identification information of a slave application, a master application may authenticate the slave application and may transmit an execution request to the slave application with an explicit intent.

Figure 2:
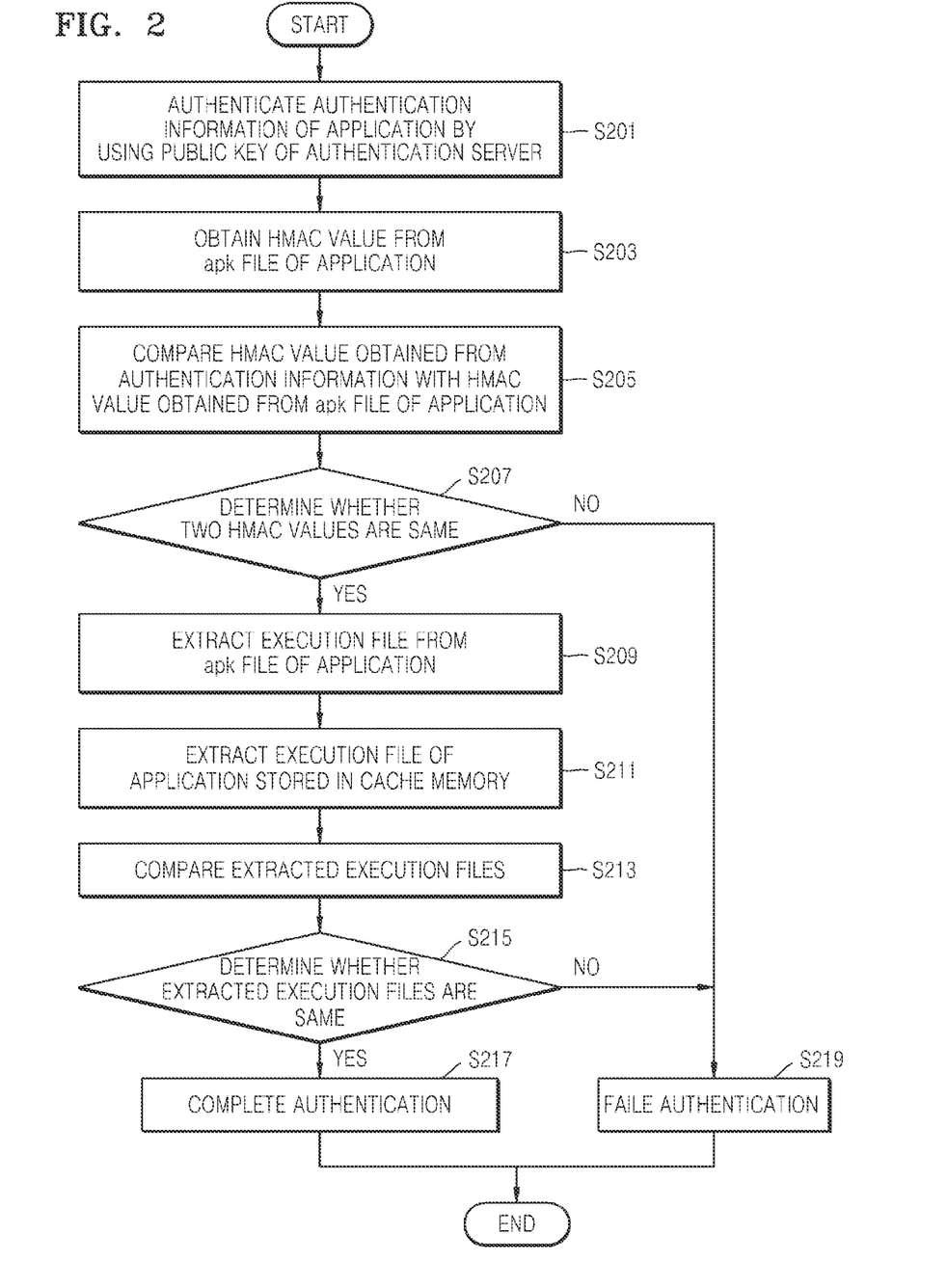
FIG. 2 is a flowchart illustrating a method performed by a first application to authenticate a second application according to an embodiment of the present disclosure.

FIG. 2 is a flowchart illustrating a method performed by a first application in a client apparatus to authenticate a second application according to an embodiment of the present disclosure.

Referring to FIG. 2, in operation S201, the first application that is to authenticate the second application may authenticate authentication information of the second application using a public key of an authentication server. The first application may confirm that the authentication information received from the authentication server is not forged or altered and an entity that transmits the authentication information is the authentication server by authenticating the authentication information with the public key and a digital signature of the authentication information encrypted with a private key. Thereafter, the first application may use the authentication information to authenticate the second application.

In operation S203, the first application may obtain authentication information to be compared with the authenticated authentication information from an apk file of the second application. In this case, the authentication information may include an HMAC value that may be obtained from an apk file of each application. The apk file is an application package file needed to install an application in the client apparatus. Files needed to execute the application are included in the apk file. The apk file may be downloaded to the client apparatus from a server that provides the apk file of the application in order to install the application. The apk file of the application having been downloaded may be stored in a /data/app folder in the client apparatus. The client apparatus may install the application using the downloaded apk file.

The first application may generate an HMAC value of the second application according to an HMAC generation algorithm by using the apk file of the second application, which is stored in the client apparatus, and a key value needed to generate the HMAC value. In this case, the key value and the HMAC generation algorithm are the same as a key value and an HMAC generation algorithm, which are stored in the authentication information of the authentication server and are used to generate the HMAC value. The key value and the HMAC algorithm may be transmitted from the authentication server to the client apparatus and may be used to generate the HMAC value.

In operation S205, the first application compares the authentication information received from the authentication server with authentication information created with the apk file of the second application. In this case, the first application may compare an HMAC value obtained from the apk file of the second application with an HMAC value included in the authentication information received from the authentication server.

In operation S207, it is determined whether the HMAC values are the same. When it is determined in operation S207 that the HMAC values are not the same, the method proceeds to operation S219. In operation S219, the second application fails to be authenticated. Otherwise, when it is determined in operation S207 that the HMAC values are the same, since the apk file of the second application is the same as an apk file registered in an application market whose safety is verified, it may be authenticated that the apk file is not forged or altered. After authenticating the apk file, the first application may continuously authenticate an execution file of the second application.

A file used to execute an application in the client apparatus is an optimized classes.dex file obtained by optimizing a classes.dex file in an apk file in an Android system. The apk file is a package file for installing the application in the client apparatus and is not a file executed when the application is executed. The optimized classes.dex file may be stored in a cache memory, for example, a /data/dalvik-cache/ folder, of the client apparatus, and the application may be executed when the optimized classes.dex file is executed. Accordingly, when the optimized classes.dex file, instead of the apk file, is forged or altered, whether the application is forged or altered may not be authenticated only by authenticating the apk file.

Accordingly, according to the present embodiment, in order for the first application to accurately detect whether the second application is forged or altered, the first application needs to authenticate not only an apk file of the second application but also an execution file of the second application.

In operation S209, in order to authenticate an execution file of the second application, the first application extracts the classes.dex file from the apk file of the second application, which is authenticated in operation S207. In operation S211, the first application may extract the optimized classes.dex file, which is the execution file of the second application stored in the cache memory of the client apparatus. The first application may extract the optimized classes.dex file by optimizing the classes.dex file extracted from the apk file of the second application. In operation S213, the first application compares the optimized classes.dex file with the optimized classes.dex file extracted in operation S211.

The optimized classes.dex file may include an odex header, a dex header, and an optimized dex body. Here, the odex header, which is a magic number, may be changed whenever an optimized*.dex file is produced. Accordingly, the first application may detect whether the execution file of the second application is forged or altered by comparing the two optimized classes.dex files in terms of the dex header and the optimized dex body except the odex header.

Although an optimized classes.dex file is used as an execution file of an application based on an Android system in FIG. 2, the present embodiment is not limited thereto, and an authentication method may be applied to any other execution file used to execute an application. For example, whether an execution file of an application is forged or altered may be authenticated by comparing an execution file obtained from an authenticated apk file with an execution file stored in a cache memory.

When it is determined in operation S215 that the two optimized classes.dex files are the same in terms of the dex header and the optimized dex body, the method proceeds to operation S217. In operation S217, the first application may finally authenticate that the second application is not forged or altered. Otherwise, when it is determined in operation S215 that the two optimized classes.dex files are not the same, the method proceeds to operation S219. In operation S219, the second application is determined to be forged or altered and the second application fails to be authenticated.

Figure 3:
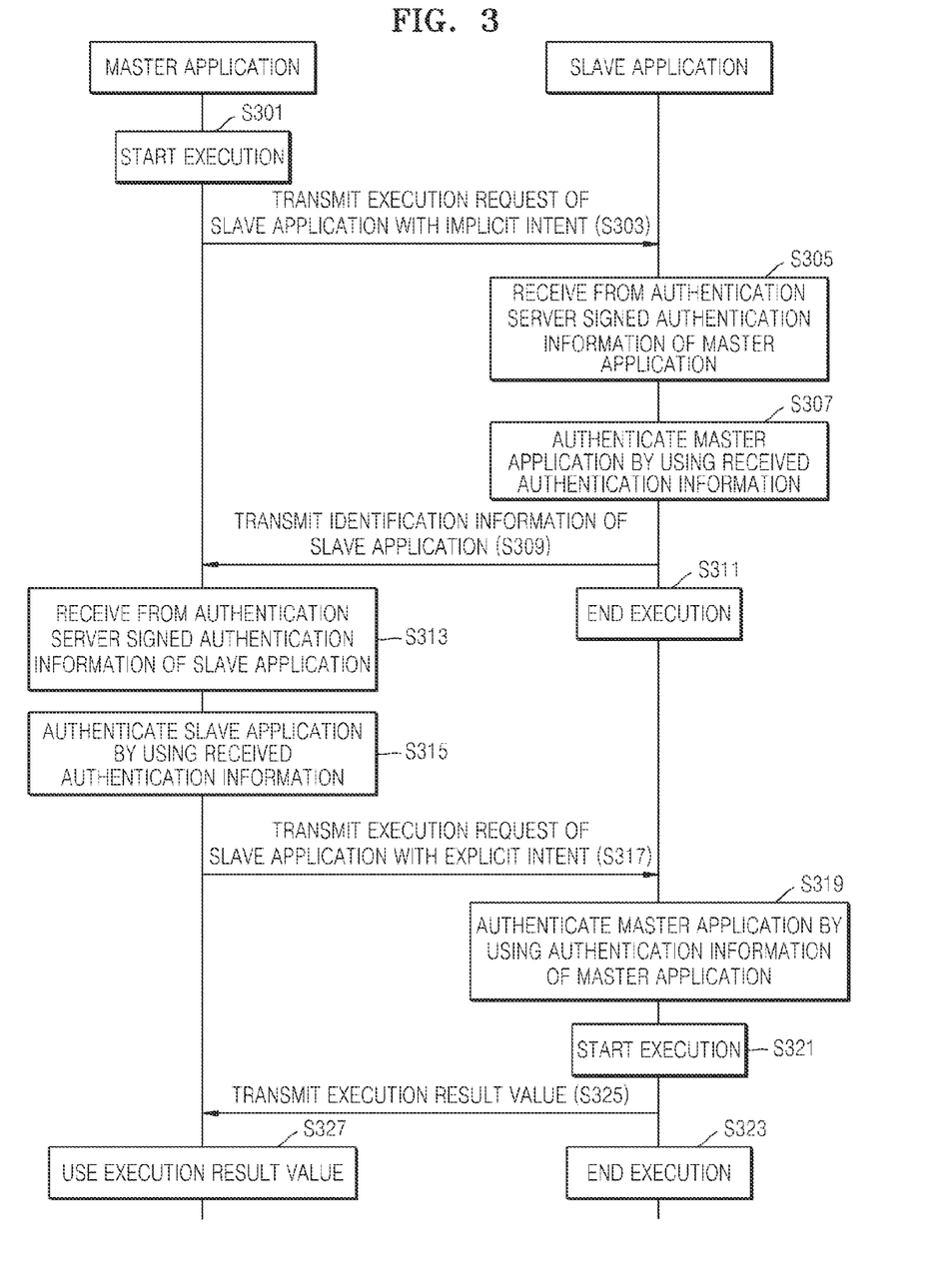
FIG. 3 is a flowchart illustrating a method of performing authentication between applications according to an embodiment of the present disclosure.

FIG. 3 is a flowchart illustrating a method of performing authentication between a master application and a slave application according to an embodiment of the present disclosure.

Assuming that the master application calls the slave application, when the slave application is forged or altered and has a security risk, an action result value of the slave application may not be trusted and when the action result value is used for the master application, a security problem may arise. Accordingly, a process performed by the master application to authenticate the slave application is needed before transmitting an execution request to the slave application. Similarly, assuming that the slave application is called by the master application and performs a requested action, when the master application is forged or altered and has a security risk, a security problem may arise when the action result value of the slave application is transmitted to the master application. Accordingly, a process performed by the slave application to authenticate the master application is needed before transmitting the action result value to the master application.

For example, when the master application is a Point-Of-Sales (POS) application and the slave application is a card reader accessory application, the mobile POS application may request information about a card with which payment is made from the card reader accessory application. In this case, when the card reader accessory application is forged or altered, the mobile POS application may make a payment with incorrect card settlement information. In addition, when the mobile POS application is forged or altered, card settlement information obtained by the card reader accessory application may be leaked by the mobile POS application.

Accordingly, in order to address these problems, a method of performing authentication between a master application and a slave application, according to an embodiment of the present disclosure, will be described.

The master application and the slave application used herein may correspond to the first application or the second application of FIGS. 1 and 2. For example, when the first application receives an execution request from the second application, the first application and the second application may respectively correspond to the slave application and the master application. When the first application transmits an execution request to the second application, the first application and the second application may respectively correspond to the master application and the slave application.

Referring to FIG. 3, in operation S301, the master application is executed. In operation S303, the master application may request an execution of the slave application with an implicit intent.

The implicit intent is a message which may be used in an Android system and includes information about an action requested to be executed by the master application. Accordingly, the Android system may analyze the implicit intent transmitted from the master application to determine which application may perform an action to be executed as requested by the master application, and may display a list of applications on a client apparatus to allow a user to select an application to execute the action. The application selected by the user is the slave application having received the execution request of the master application in the present embodiment.

However, when the master application transmits an execution request to the slave application with an implicit intent, since identification information of the selected application is not transmitted to the master application, the master application may not know which application is the slave application. Hence, without a process of authenticating the slave application, the master application transmits the execution request to the slave application with the implicit intent. The slave application having received the execution request authenticates the master application, and transmits identification information of the slave application to the master application. The master application may authenticate the slave application using the identification information and may re-transmit the execution request to the slave application.

Accordingly, so as for the slave application to authenticate the master application, the master application may also transmit identification information of the master application to the slave application through the Android system when transmitting the implicit intent. The identification information may include information about a software version and a package name of each application so as to identify authentication information of the application and an apk file of the application.

In operation S305, while transmitting the identification information of the master application to an authentication server, the slave application may request authentication information of the master application and receive the authentication information. In this case, the slave application may also receive a digital signature for authenticating the authentication information. The authentication server may transmit to the slave application, along with a digital signature, authentication information about an apk file corresponding to information about the software version and the package name of the master application included in the identification information. The authentication information may include an HMAC value of the apk file of each application to be authenticated.

The authentication information transmitted to the slave application is stored in a memory of the client apparatus and may be later used. Since the authentication information is signed with a private key of the authentication server, and thus, may not be forged or altered when the private key of the authentication server is not known, the authentication information carrying the digital signature has no possibility of forgery or alteration as long as the authentication information is authenticated with a public key of the authentication server. This is because the digital signature may be generated with the private key of the authentication server, and the digital signature generated with the private key of the authentication server may be decrypted with the public key of the authentication server. Accordingly, even when both authentication information and a digital signature of an application are stored in the memory of the client apparatus and the application is used to authenticate the same apk file, the risk of a security problem is low.

In operation S307, the slave application may authenticate the master application using the authentication information of the master application. More specifically, the slave application may determine whether the authentication information is forged or altered by using the public key of the authentication server and the digital signature of the authentication information signed with the private key of the authentication server. In addition, the slave application may determine whether the apk file is forged or altered by comparing the authentication information received from the authentication server with authentication information generated from the apk file of the master application. In the present embodiment, the signed authentication information refers to the authentication information carrying the digital signature. Accordingly, whether the signed authentication information is forged or altered may be determined by using the public key of the authentication server.

The slave application may authenticate the master application by determining whether an execution file is forged or altered by comparing an optimized classes.dex file extracted from the apk file with an optimized classes.dex file stored in a cache memory. When it is determined that the apk file is forged or altered, without needing to determine whether the execution file is forged or altered, the master application may be determined to fail to be authenticated.

When it is authenticated that the master application is not forged or altered, the method proceeds to operation S309. In operation S309, the slave application transmits identification information of the slave application to the master application. In operation S311, an execution of the slave application ends. The reason why the execution of the slave application ends is that since the slave application is not yet authenticated, when the slave application performs an action requested by the master application, a security problem may arise.

When receiving the identification information of the slave application, the master application authenticates the slave application. In operation S313, the master application may request and receive signed authentication information of the slave application while transmitting the identification information of the slave application to the authentication server. The authentication server may transmit to the master application the signed authentication information of the apk file corresponding to information about a software version and a package name of the slave application included in the identification information. The signed authentication information may be stored in the memory of the client apparatus and may be used to authenticate the same apk file as the apk file.

In operation S315, the master application may authenticate the slave application using the authentication information of the slave application. More specifically, the master application may determine whether the authentication information signed with the private key of the authentication server is forged or altered by using the public key of the authentication server and may determine whether the apk file is forged or altered by comparing the authentication information with authentication information generated from the apk file of the slave application. The master application may completely authenticate the slave application by determining whether an execution file is forged or altered by comparing an optimized classes.dex file extracted from the apk file of the slave application with an optimized classes.dex file stored in the cache memory. When it is determined that the apk file is forged or altered, without needing to determine whether the execution file is forged or altered, the slave application may be determined to be forged or altered.

In operation S317, when it is determined that the slave application is not forged or altered, the master application may request an execution of the slave application with an explicit intent. In this case, the master application may also transmit identification information of the master application to the slave application.

The explicit intent is a message which may be used in an Android system and includes not only information about an action requested to be executed by the master application but also information about the slave application that is to perform the action. Accordingly, the master application may request the action from the slave application selected in operation S303.

In this case, the master application may also transmit a value needed for the action of the slave application, for example, payment amount information, to the slave application. In addition, the master application may generate a private key and a public key as a pair which may be disposably used in order to safely receive an action result value from the slave application, and may transmit the public key to the slave application. Accordingly, the slave application may encrypt the action result value with the public key, and transmit the action result value to the master application. Data encrypted with the public key may be decrypted with the private key. Accordingly, even when the data leaks to an external apparatus, since the external apparatus may not know the private key and thus, may not decrypt the data, the security of the transmitted data may be maintained. Since the private key and the public key used by the master application and the slave application are disposably used, the private key and the public key may be discarded when the data including the action result value is completely transmitted.

Before the slave application having been executed with the explicit intent performs an action according to the execution request of the master application, in operation S319, the slave application authenticates the master application. Although the slave application has already authenticated the slave application in operation S307, since the slave application ends after the master application is authenticated, the slave application having been re-executed with the explicit intent needs to re-authenticate the master application.

In operation S319, the slave application may authenticate the master application using the authentication information of the master application. The slave application may authenticate the master application using the signed authentication information of the master application, which is received in operation S305 and stored in the memory of the client apparatus. More specifically, the slave application may determine whether the authentication information is forged or altered by using the public key of the authentication server and the digital signature of the authentication information encrypted with the private key of the authentication information. In addition, the slave application may determine whether an apk file is forged or altered by comparing the authentication information with authentication information generated from the apk file of the master application. The slave application may authenticate the master application by determining that an execution file is forged or altered by comparing an optimized classes.dex file extracted from the apk file with an optimized classes.dex file stored in the cache memory. When it is determined that the apk file is forged or altered, without needing to determine whether the execution file is forged or altered, the master application may be determined to be forged or altered.

When it is determined in operation S319 that the master application is not forged or altered, the method proceeds to operation S321. In operation S321, the slave application performs an action requested by the master application. In operation S325, the slave application transmits an action result value to the master application. In this case, the action result value may be encrypted with the public key transmitted from the master application in a public key exchange method and may be transmitted to the master application. In operation S323, the slave application ends an execution after transmitting the action result value to the master application.

In operation S327, the master application having received the action result value from the slave application may perform another action by using the action result value. For example, when the action result value is information about a card with which payment is to be made, the mobile POS application, which is the master application, may make payment by using the card information.

Figure 4:
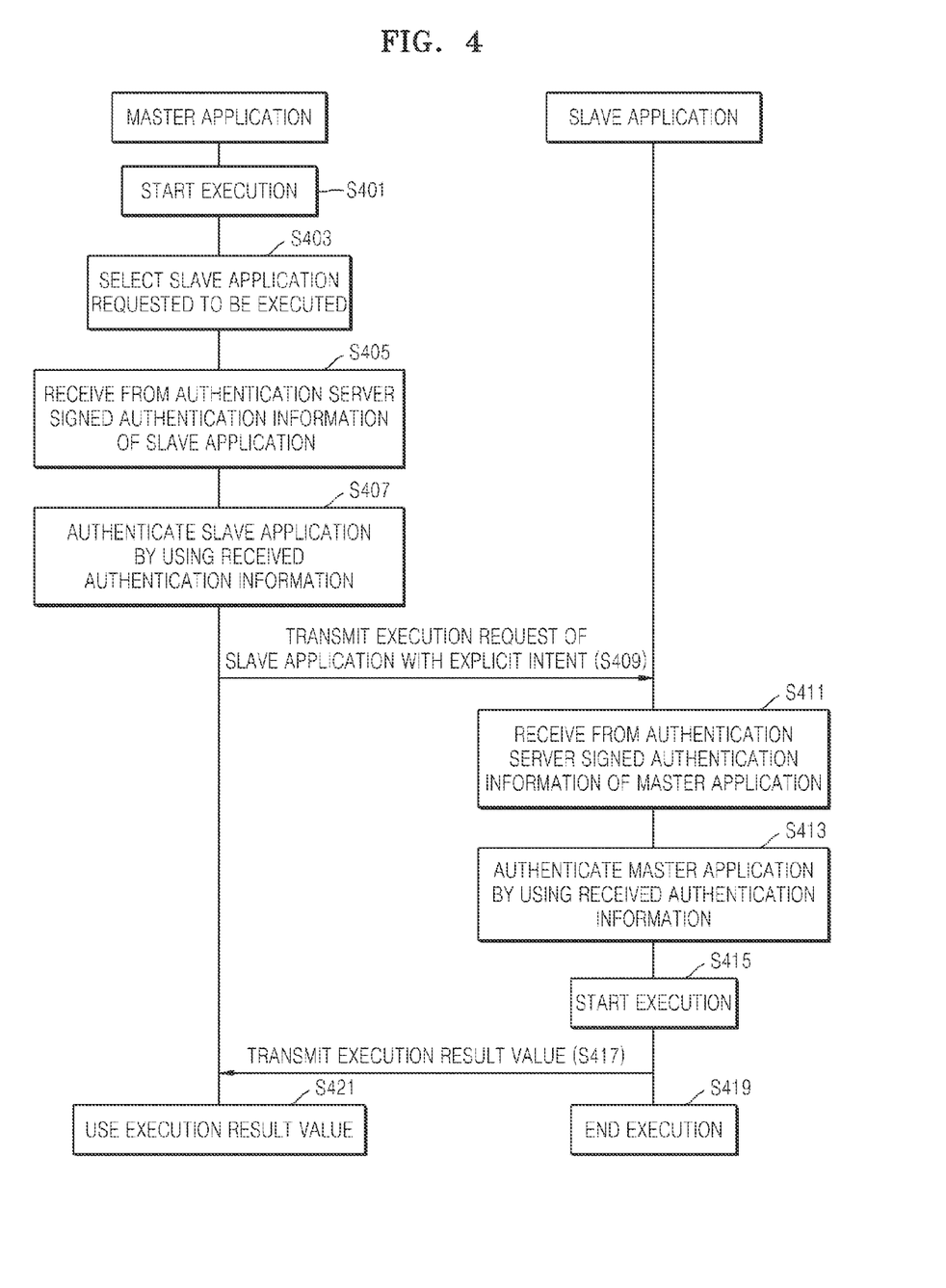
FIG. 4 is a flowchart illustrating a method of performing authentication between applications according to an embodiment of the present disclosure.

FIG. 4 is a flowchart illustrating a method of performing authentication between applications according to an embodiment of the present disclosure.

The method of FIG. 3 has a problem that since the slave application authenticates the master application two times, it takes a long time for the master application to use the action result value received from the slave application.

In order to address this problem, after the master application first authenticates the slave application, the master application may transmit an execution request to the slave application. To this end, the client apparatus may further include an application management unit that may transmit identification information of the slave application to the master application. The application management unit may obtain identification information of applications installed in the client apparatus and transmit the identification information of the slave application to the master application. In addition, the application management unit may generate a list of applications which may perform an action requested by the master application using information about an action which may be executed by each application. In FIG. 4, authentication of the master application and the slave application may be performed one time.

Referring to FIG. 4, in operation S401, a master application is executed. In operation S403, the master application may select a slave application requested to be executed. More specifically, the master application may request a list of applications, which may execute a desired action, from an application management unit. The list of applications generated by the application management unit according to the request may be displayed on a display screen (not shown) in a client apparatus and a user may select an application. Once the application is selected, the master application may receive from the application management unit identification information of the selected application, that is, the slave application, before transmitting an execution request to the slave application. Accordingly, the master application may authenticate the slave application using the identification information of the slave application, and may transmit an execution request to the slave application with an explicit intent.

Alternatively, the master application may request identification information of each application installed in the client apparatus from the application management unit. According to the request, the master application may receive the identification information of the application installed in the client apparatus from the application management unit. The master application may generate a list of applications which may execute a desired action by using the received identification information of each application. The generated list of applications may be displayed on the display screen (not shown) in the client apparatus and one application may be selected by the user. The master application authenticates the slave application using identification information of the slave application from among the identification information about each application received from the application management unit, and may transmit an execution request to the slave application with an explicit intent.

In operation S405, the master application receives signed authentication information from an authentication server by using the identification information of the slave application. In operation S407, the master application may authenticate the slave application. Operations S405 and S407 correspond to operations S303 and S305 of FIG. 3, and thus, a repeated explanation thereof will not be given.

When it is determined that the slave application is not forged or altered, the method proceeds to operation S409. In operation S409, the master application may transmit an execution request to the slave application with an explicit intent. In this case, the master application may also transmit identification information of the master application to the slave application. Operation S409 corresponds to operation S317 of FIG. 3, and thus, a repeated explanation thereof will not be given.

In operation S411, the slave application may request and receive signed authentication information of the master application while transmitting the identification information of the master application to the authentication server. In operation S413, the slave application may authenticate the master application using the authentication information of the master application. Operations S411 and S413 correspond to operations S305 and S307 or S319 of FIG. 3, and thus, a repeated explanation thereof will not be given.

When the slave application authenticates that the master application is not forged or altered, the method proceeds to operation S415. In operation S415, the slave application performs an action requested by the master application. In operation S415, the slave application transmits an action result value to the master application. In operation S419, the slave application ends an execution after transmitting the action result value to the master application. In operation S421, the master application having received the action result value from the slave application may perform another action by using the action result value. Operations S415 through S421 correspond to operations S321 through S327 of FIG. 3, and thus, a repeated explanation thereof will not be given.

Figure 5:
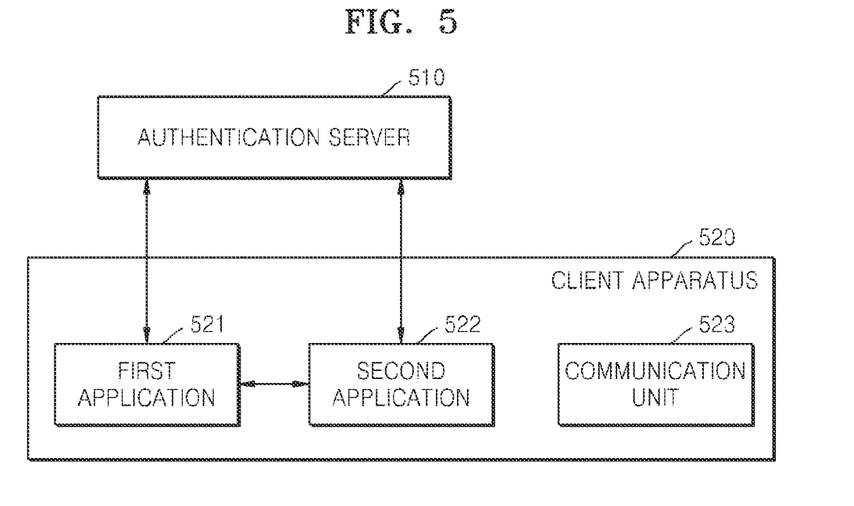
FIG. 5 is a block diagram illustrating a client apparatus for performing authentication between applications according to an embodiment of the present disclosure.

FIG. 5 is a block diagram illustrating a client apparatus for performing authentication between applications according to an embodiment of the present disclosure.

Referring to FIG. 5, a security system may include an authentication server 510 and a client apparatus 520.

The authentication server 510 may store a public key of the authentication server 510 and authentication information, which is digitally signed with a private key of the authentication server 510, and may transmit the public key and the authentication information to the client apparatus 520. The digitally signed authentication information is information that is generated by encrypting a hash value of the authentication information with the private key of the authentication server 510 and carries a digital signature. Accordingly, the digitally signed authentication information may be authenticated by using the public key of the authentication server 510 and the digital signature. Authentication information and an apk file, which may be identified according to a software version and a package name of each application, may form a pair and may be stored in the authentication server 510. The authentication information may include an HMAC value of the apk file.

The client apparatus 520 may include a Personal Computer (PC), a notebook computer, a mobile phone, a tablet, a navigation terminal, a smart phone, a Personal Digital Assistant (PDA), a Portable Multimedia Player (PMP), a digital broadcast receiver, and the like. However, the present embodiment is not limited thereto, and any apparatus which is being currently developed and commonly used or may be developed for communication in the future may be used as the client apparatus 520.

The client apparatus 520 may include a first application 521, a second application 522, and a communication unit 523.

When receiving an execution request from the second application 522, the first application 521 may transmit identification information, including a software version and a package name of the second application 522, to the authentication server 510, and may request, from the authentication server 510, for authentication information signed with the private key of the authentication server 510 of the second application 522. The first application 521 may authenticate the second application 522 by using the authentication information received from the authentication server 520, and may execute an action according to the execution request of the second application 522.

Alternatively, before transmitting an execution request to the second application 522, the first application 521 may receive from the authentication server 510 signed authentication information of the second application 522, and may authenticate the second application 522 by using the authentication information. Thereafter, the first application 521 may transmit an execution request to the second application 522. When receiving an action result value from the second application 522, the first application 521 may perform another action by using the action result value.

The communication unit 523 supports a wired or a wireless communication such that the client apparatus 520 may transmit/receive data to/from the authentication server 510.

Figure 6:
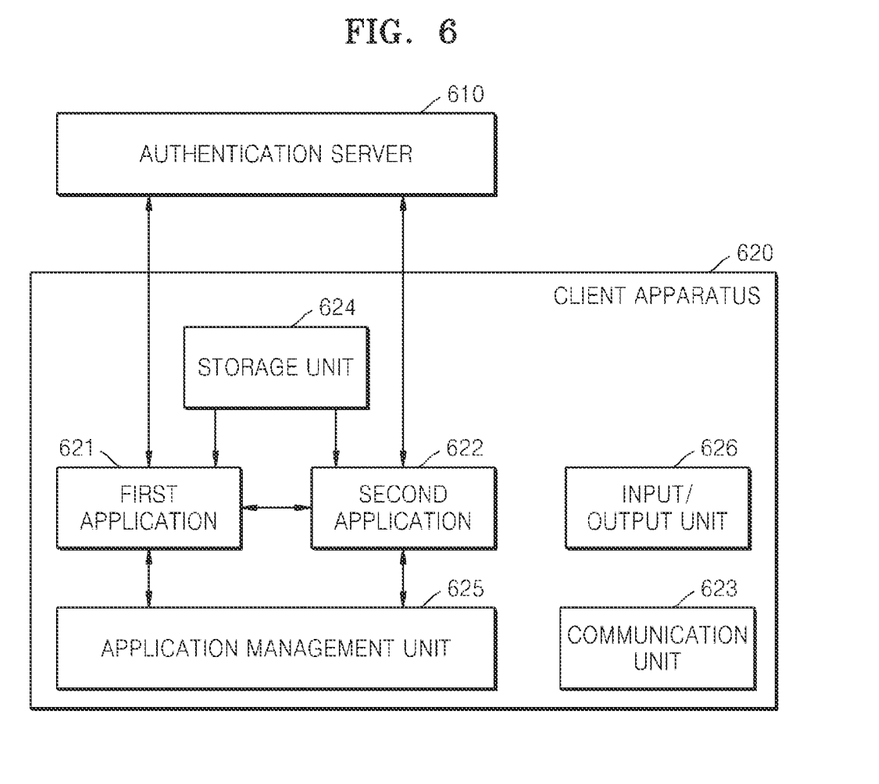
FIG. 6 is a block diagram illustrating a client apparatus for performing authentication between applications according to an embodiment of the present disclosure.

FIG. 6 is a block diagram illustrating a client apparatus for performing authentication between applications according to an embodiment of the present disclosure.

Referring to FIG. 6, an authentication server 610, a client apparatus 620, a first application 621, a second application 622, and a communication unit 623 of FIG. 6 correspond to the authentication server 510, the client apparatus 520, the first application 521, the second application 522, and the communication unit 523 of FIG. 5, and thus, a repeated explanation thereof will not be given.

The client apparatus 620 may further include a storage unit 624, an application management unit 625, and an input/output unit 626.

The storage unit 624 may store a public key and signed authentication information, that is, authentication information and a digital signature of the authentication information, of the authentication server 610 received from the authentication server 610. The authentication information may include an HMAC value of an apk file of each application to be authenticated.

The public key of the authentication server 610 which is used to authenticate the signed authentication information may be used to determine whether the authentication information signed according to a digital signature method is forged or altered.

Authentication information may be identified according to identification information of each application including information about a software version and a package name of the application. An application of the client apparatus 620 may be authenticated by authentication information corresponding to the identification information. The authentication information transmitted from the authentication server 610 may be stored in the storage unit 624, and each application may be authenticated by using the authentication information stored in the storage unit 624.

The application management unit 625 may collect action information about an action which may be executed by each of the applications in the client apparatus 620 to generate a list of applications which may execute a specific action, or may transmit identification information of an application selected by a user to a master application.

The application management unit 625 receiving a request to generate a list of applications which may execute a desired action from the master application may generate an application list by using the collected action information. In addition, the application management unit 625 may transmit the generated application list and identification information of applications included in the application list to the master application. Accordingly, when the user selects an application to be executed, the master application may authenticate the application using identification information of the selected application.

Alternatively, without transmitting an application list and identification information of applications included in the application list to the master application, the application management unit 625 may control an application list to be displayed on a display screen (not shown) in the client apparatus 620 so as for the user to select an application to be executed. The master application may authenticate the selected application, that is, a slave application, by using identification information of the selected application.

Alternatively, the application management unit 625 of the client apparatus 620 may transmit identification information of the slave application before the master application, which is to call another application, transmits an execution request to the slave application. Accordingly, the master application may authenticate the slave application using the identification information of the slave application, and may transmit an execution request to the slave application.

In FIG. 5, three authentication processes are performed because the slave application ends and thus, the master application is authenticated twice. In FIG. 6, however, each of the master application and the slave application may be authenticated once and thus, two authentication processes may be performed, thereby performing authentication between applications faster than that in FIG. 5.

The input/output unit 626 includes an input unit that may receive the user's input and an output unit that may output a user interface and a process result.

According to the one or more embodiments of the present disclosure, in an Android system which has poor security, whether another application is forged or altered may be determined by receiving authentication information from an authentication server without having an application to directly manage a private key or without intervention of an authentication organization.

In addition, according to the one or more embodiments of the present disclosure, when a master application calls a slave application, high reliability of information exchange may be ensured through authentication between the master application and the slave application.

Certain aspects of the present disclosure may be embodied as computer-readable code on a non-transitory computer-readable recording medium. A non-transitory computer-readable recording medium is any data storage device that can store data which can be thereafter read by a computer system. Examples of the non-transitory computer-readable recording medium include Read-Only Memories (ROMs), Random-Access Memories (RAMs), Compact Disc (CD)-ROMs, magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a first application in a client apparatus to authenticate a second application in the client apparatus, the method comprising:
   requesting, when the first application receives an execution request of the second application, authentication information of the second application from an authentication server;
   obtaining the authentication information of the second application from the authentication server;
   authenticating, by the first application, a package of the second application by using the authentication information;
   extracting a first execution file of the second application from the package of the second application and a second execution file of the second application from a cache memory; and
   authenticating the second execution file of the second application by comparing the first execution file with the second execution file,
   wherein the authentication information of the second application includes information for authenticating integrity of the package of the second application.

2. The method of claim 1, wherein the authenticating of the package of the second application further comprises:
   authenticating the authentication information of the second application by using a public key of the authentication server; and
   comparing a hash-based message authentication code (HMAC) value of the second application with an HMAC value included in the authenticated authentication information.

3. The method of claim 1, further comprising:
   transmitting, according to a result of the authenticating of the second application,
   identification information of the first application to the second application from the first application;
   authenticating, by the second application, the first application by using the identification information of the first application; and
   transmitting the execution request from the second application to the first application based on a result of the authenticating of the first application.

4. The method of claim 2, further comprising:
   authenticating, when the first application receives the execution request of the second application after the second application authenticates the first application, by the first application, the second application using the authentication information of the second application; and
   enabling, according to a result of the authentication of the second application, the first application to perform an action requested by the second application.

5. The method of claim 1, further comprising:
   executing, by the first application, an action requested by the second application based on a result of the authenticating of the second application; and
   transmitting an action result value to the second application.

6. The method of claim 1, further comprising:
   authenticating, by the second application, the first application selected to receive the execution request from the second application, the execution request being transmitted to the first application based on a result of the authenticating of the first application,
   wherein the authenticating of the first application comprises:
      authenticating a package of the first application;
      extracting a first execution file of the first application from the package of the first application and a second execution file of the first application from a cache memory; and
      authenticating the second execution file of the first application by comparing the first execution file with the second execution file.

7. A client apparatus in which a first application authenticates a second application, the apparatus comprising:
   at least one processor configured to:
      obtain identification information of applications installed in the client apparatus, and
      transmit the identification information of the second application to the first application; and
   a storage device configured to store a public key and signed authentication information,
   wherein the first application, when receiving an execution request of the second application, requests authentication information of the second application from an authentication server, obtains the authentication information of the second application from the authentication server, authenticates a package of the second application by using the authentication information, extracts a first execution file of the second application from the package of the second application and a second execution file of the second application from a cache memory, and authenticates the second execution file of the second application by comparing the first execution file with the second execution file,
   wherein the second application transmits the execution request to the first application,
   wherein the authentication information of the second application includes information for authenticating integrity of the package of the second application.

8. The apparatus of claim 7, wherein the first application authenticates the authentication information of the second application using a public key of the authentication server, and compares a hash-based message authentication code (HMAC) value of the second application with an HMAC value included in the authenticated authentication information.

9. The apparatus of claim 7,
   wherein the first application, according to a result of the authenticating of the second application, transmits identification information of the first application to the second application, and
   wherein the second application authenticates the first application by using the identification information of the first application, and transmits the execution request from the second application to the first application based on a result of the authenticating of the first application.

10. The apparatus of claim 9, wherein, the first application, when receiving the execution request of the second application after the second application authenticates the first application, authenticates the second application by using the authentication information of the second application, and according to a result of the authentication, performs an action requested by the second application.

11. The apparatus of claim 7, wherein, the first application executes an action requested by the second application based on a result of the authenticating of the second application, and transmits an action result value to the second application.

12. The apparatus of claim 7,
wherein the second application authenticates the first application selected to receive the execution request from the second application,
wherein the execution request being transmitted to the first application is based on a result of the authentication of the first application, and
wherein the authenticating of the first application comprises:
authenticating a package of the first application;
extracting a first execution file of the first application from the package of the first application and a second execution file of the first application from a cache memory; and
authenticating the second execution file of the first application by comparing the first execution file with the second execution file.

13. A non-transitory processor readable medium for storing a computer program of instructions configured to be readable by at least one processor for instructing the at least one processor to execute a computer process for performing the method as recited in claim 1.

* * * * *